(12) United States Patent
Kato et al.

(10) Patent No.: US 6,594,375 B1
(45) Date of Patent: Jul. 15, 2003

(54) IMAGE PROCESSING APPARATUS, IMAGE PROCESSING METHOD, AND STORAGE MEDIUM

(75) Inventors: Masami Kato, Sagamihara (JP); Takashi Miyasaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/401,794

(22) Filed: Sep. 22, 1999

(30) Foreign Application Priority Data

Sep. 28, 1998 (JP) .......................................... 10-273131
Jun. 18, 1999 (JP) .......................................... 11-172614

(51) Int. Cl.$^7$ ................................................. G06K 9/00
(52) U.S. Cl. ........................ 382/107; 706/13; 382/236
(58) Field of Search ................................. 382/100, 128, 382/129, 130, 133, 195, 236, 115, 118, 103, 107; 436/177, 174; 706/13; 359/370, 368, 483; 435/6, 7.2, 1.1, 91.41, 91.42, 440, 442, 445; 703/11; 348/79

(56) References Cited

U.S. PATENT DOCUMENTS 5,815,198 A * 9/1998 Vachtsevanos et al. ....... 348/88
5,978,507 A * 11/1999 Shackleton et al. ......... 382/195
6,148,274 A * 11/2000 Watanabe et al. ............. 703/6

FOREIGN PATENT DOCUMENTS

JP          10-21394        1/1998

OTHER PUBLICATIONS

Yokoo, Hagiwara, "Extraction Of A Plurality Of Face Areas From A Natural Image Using A Genetic Algorithm," Journal of the Institute Of Electrical Engineers Of Japan, vol. 117–C, No. 9, pp. 1245–1252, 1997.

Hara, Nagao, "Extraction Of A Face Area In An Arbitrary Direction In An Image Using GA," Technical Report HCS97-12, pp. 37–44, 1997.

* cited by examiner

Primary Examiner—Bhavesh M. Mehta
Assistant Examiner—Seyed Azarian
(74) Attorney, Agent, or Firm—Fitzpatrick, Cella, Harper & Scinto

(57) ABSTRACT

An image processing method for determining an area representing a particular image from a moving image using a genetic algorithm, includes the steps of extracting a current frame image from a series of moving image data, producing a plurality of initial chromosomes indicating the particular image from a frame image previous to the current frame image, and determining the area of the particular image in the current frame image by executing a genetic algorithm on the initial chromosomes. According to this image processing method, it is possible to precisely and quickly determine an area of a particular image from a moving image.

10 Claims, 17 Drawing Sheets

| x: 8 BITS | y: 8 BITS | rx: 8 BITS | ry: 8 BITS |

IMAGE PROCESSING APPARATUS, IMAGE PROCESSING METHOD, AND STORAGE MEDIUM

BACKGROUND OF THE INVENTION

1. Field of the Invention

The present invention relates to a method and apparatus for processing an image and also to a storage medium in which an area representing a particular image is detected from a series of moving frame images.

2. Description of the Related Art

In moving image transmission systems such as a video telephone system and a video conference system, an important image to transmit is a human image. In particular, a high-quality face image is needed to be transmitted in a compressed fashion. In order to efficiently use communication bands, where a human face area is assigned a large number of codes, the number of codes assigned to a background area is greatly reduced so as to reduce the total number of codes while maintaining the image quality to a desired level. To this end, extraction means is required for accurately extracting a face area at a high speed.

Various techniques for extracting a human face area from a two-dimensional image have been proposed. Hagiwara et al. have proposed a technique of modeling the contour of a face using an ellipse and searching for the face area according to a genetic algorithm (Yokoo, Hagiwara, "Extraction of a Plurality of Face Areas from a Natural Image Using a Genetic Algorithm", Journal of the Institute of Electrical Engineers of Japan, Vol. 117-C, No. 9, pp. 1245–1252, 1997). Hara et al. have proposed a technique of detecting a face area by means of matching with a template of a face according to a genetic algorithm (Hara, Nagao, "Extraction of a Face Area in an Arbitrary Direction in an Image Using GA", Technical Report HCS97-12, pp. 37–44, 1997, the Institute of Electronics, Information, and Communications Engineers).

The above-described techniques using the genetic algorithm allows high-accuracy detection. However, the problem of these techniques is that a large number of computing processes are required, and thus these techniques cannot be employed to process a moving image in a real time. Japanese Patent Laid-Open No. 10-21394 discloses a technique in which preprocessing is performed to roughly determine an area to be searched on the basis of hue information and then only the obtained area is searched by means of pattern matching according to a genetic algorithm thereby achieving high-speed searching. However, even this technique still needs a large amount of computation in the preprocessing. Another problem of this technique is that features of a moving image are not effectively utilized.

SUMMARY OF THE INVENTION

In view of the above, an object of the present invention is to provide a technique of accurately and quickly detecting an area representing a particular image from a moving image.

The above object can be achieved by the present invention having various aspects as described below.

According to a first aspect of the present invention, there is provided an image processing method for determining an area representing a particular image from a moving image using a genetic algorithm, the method including the steps of: extracting a current frame image from a series of moving image data; producing a plurality of initial chromosomes indicating the particular image from a frame image previous to the current frame image; and determining the area of the particular image in the current frame image by executing a genetic algorithm on the initial chromosomes.

According to a second aspect of the present invention, there is provided an image processing method for determining an area representing a particular image from a moving image using a genetic algorithm, the method including the steps of: extracting a frame image from a series of moving image data; a first production step for randomly producing a plurality of initial chromosomes including a parameter indicating the particular image; a second production step for producing a plurality of initial chromosomes including a parameter indicating an area of the particular image; determining an evaluation value indicating the fitness, to the frame image, of the plurality of chromosomes produced in the first and second production steps; a selection/reproduction step in which a chromosome having a low evaluation value is removed from the plurality of chromosomes, and a chromosome having a high evaluation value is reproduced; performing crossing-over with a predetermined probability upon a plurality of chromosomes obtained in the selection/reproduction step; performing mutation upon a plurality of chromosomes obtained in the crossing-over step; and a determination step in which, if a chromosome is obtained which has an evaluation value greater than a predetermined threshold value under a predetermined condition after iterating the evaluation step, selection/reproduction step, crossing-over step, and mutation step, a parameter represented by the chromosome is determined as a parameter representing the area of the particular image of the frame image.

Further objects, features and advantages of the present invention will become apparent from the following detailed description of embodiments of the present invention with reference to the accompanying drawings.

DESCRIPTION OF THE PREFERRED EMBODIMENTS

First Embodiment

Figure 1:
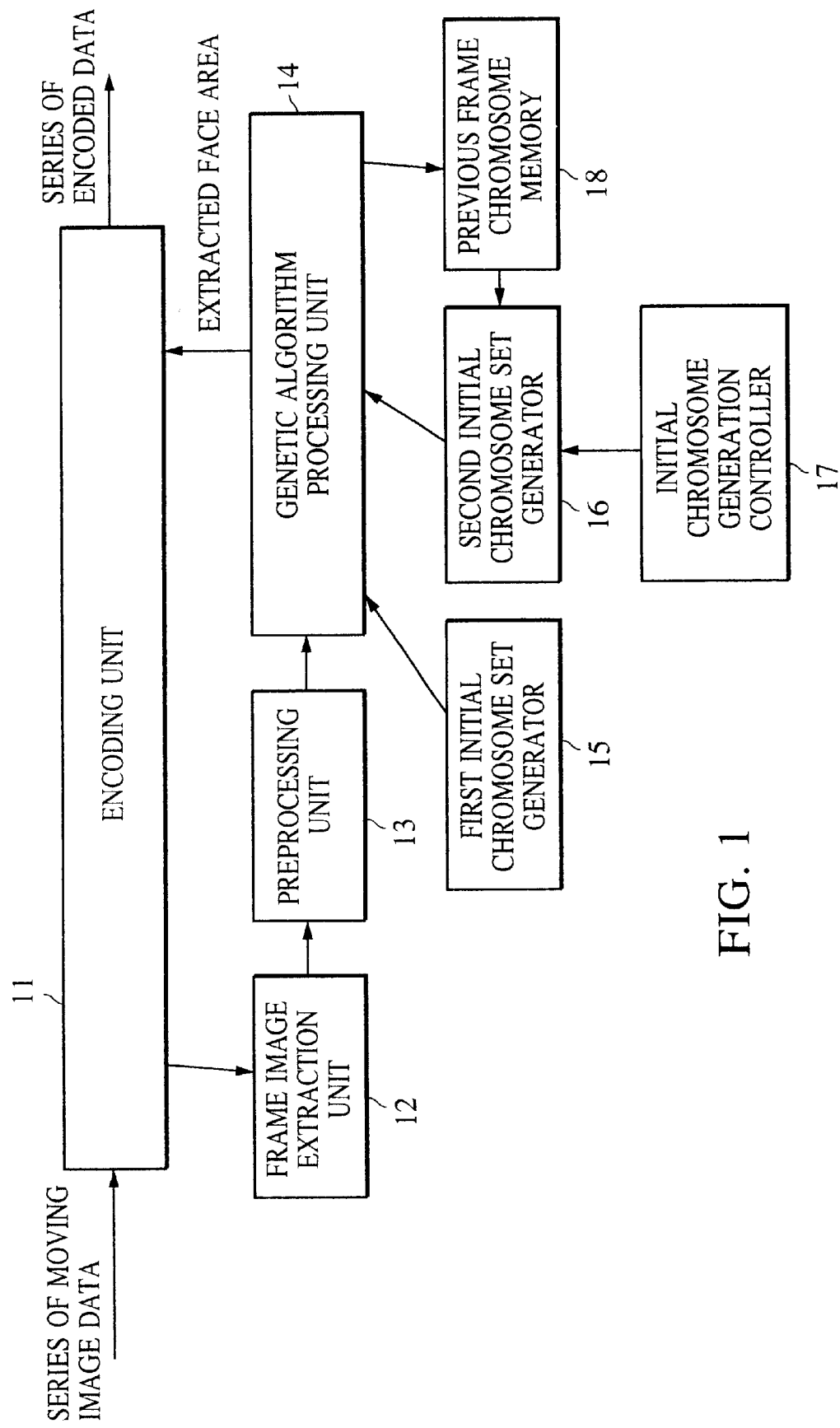
FIG. 1 is a block diagram illustrating the basic construction of an image encoding apparatus.

A first embodiment is described below with reference to the accompanying drawings. FIG. 1 is a block diagram illustrating the basic construction of a moving image encoding apparatus using a face area extraction apparatus. In FIG. 1, reference numeral 11 denotes an encoding unit for compressing a moving image according to an encoding scheme such as the Motion JPEG (Joint Photographic Experts Group) standard or the ITU-T recommendations H.261/H.263. The encoding unit 11 controls the quantization factors according to the result of extraction of a face area such that quantization with a small step is performed only for the face area thereby precisely encoding the human face area without increasing the total number of codes. A frame image extraction unit 12 extracts a frame to be encoded from a series of moving image data. A preprocessing unit 13 performs preprocessing such as removal of noise and edge extraction in preparation for a face area extraction process. A genetic algorithm extraction processing unit 14 searches for a face area pattern in the edge image data obtained by the preprocessing unit 13, using a genetic algorithm and calculates the parameters such as the coordinates, the size, and the inclination of the face in the image. According to the result of the face area extraction, the encoding unit 11 controls the quantization factors. A first initial chromosome set generator 15 randomly produces a plurality of chromosomes indicating the face area. A second initial chromosome set generator 16 produces a plurality of chromosomes based on the chromosome set of a previous frame stored in a chromosome set memory 18 and on the parameters given by an initial chromosome production controller 17.

Figure 2:
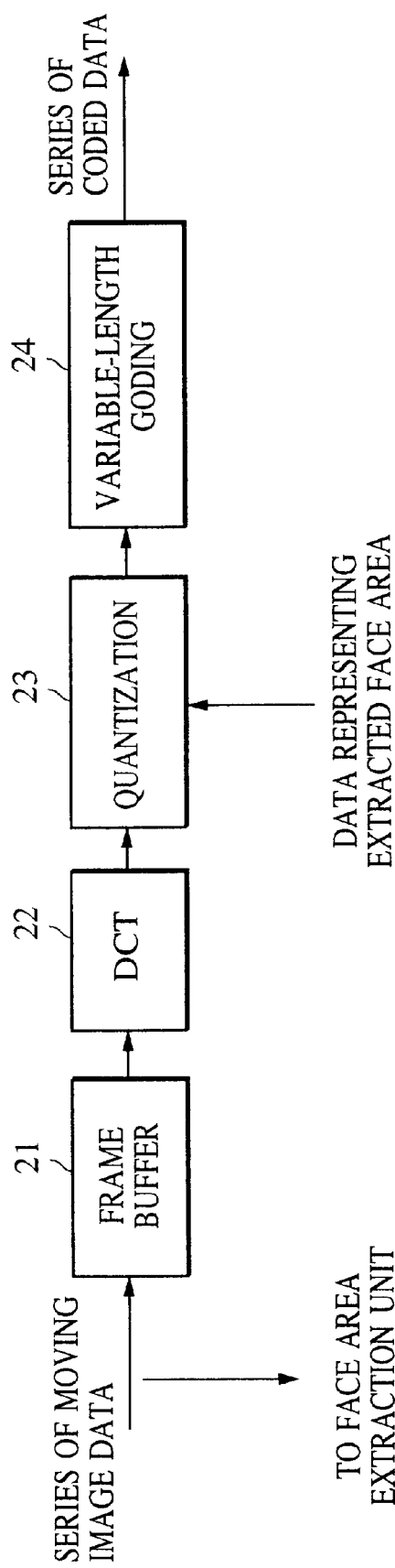
FIG. 2 is a block diagram illustrating the construction of the encoding unit.

The details of major processing units of the present embodiment are described below. FIG. 2 illustrates an example of the construction of the encoding unit. In this embodiment, for ease of illustration, the encoding unit is assumed to encode a moving image according to the Motion JPEG standard. A frame buffer 21 produces image data delayed by one frame for use in a face area detection process. A DCT (Discrete Cosine Transform) unit 22 performs an orthogonal transformation upon the image data. A quantization unit 23 quantizes transformation coefficients given by the DCT unit 22. The quantization factors used by the quantization unit 23 are controlled according to the result of the face area extraction.

Figure 3:
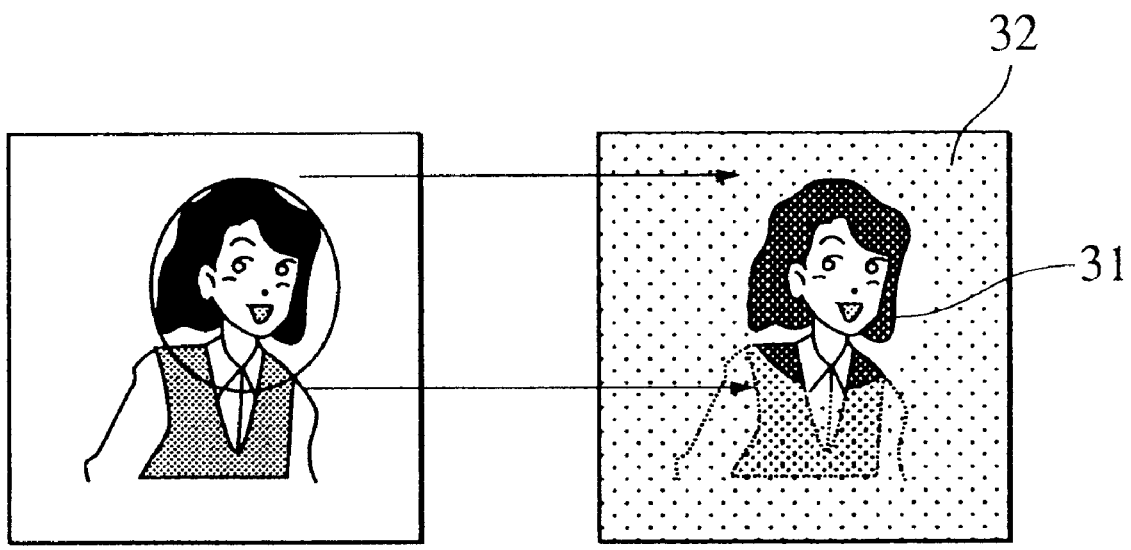
FIG. 3 is a schematic representation of an image encoding process.

FIG. 3 schematically illustrates an example of processing performed by the encoding unit. For example, two quantization factors, large and small quantization factors, are prepared. An area 31 which has been determined as a face area is quantized using the small quantization factor, and a background area 32 other than the area 31 is quantized using the large quantization factor. A variable length encoding unit 24 scans the quantized transformation coefficients in a zigzag fashion and converts them into entropy codes using the Huffman coding scheme or the like. By performing the above-described process, it is possible to precisely encode the human face area into compressed codes without causing a significant increase in the total number of codes.

Figure 4:
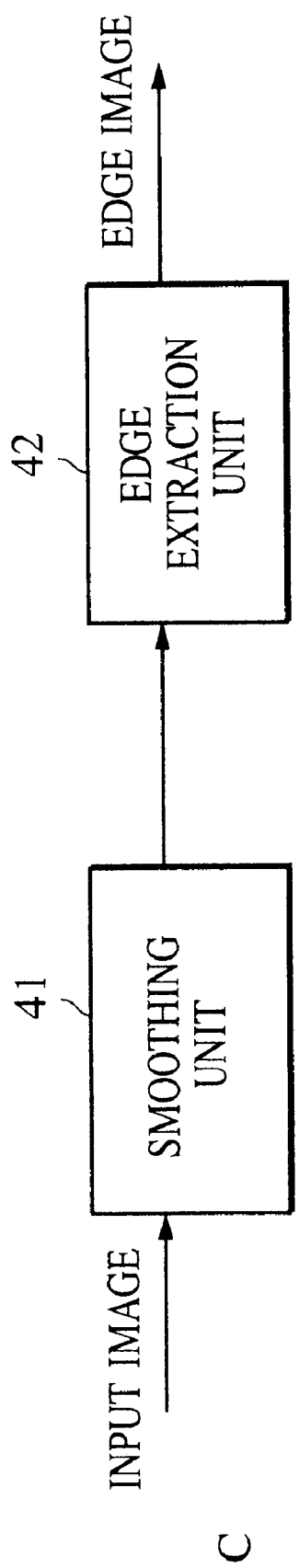
FIG. 4 is a block diagram illustrating the construction of the preprocessing unit.

FIG. 4 illustrates the construction of a preprocessing unit 12. A smoothing unit 41 removes noise from an input image by performing a smoothing and filtering process upon the input image. An edge extraction unit 42 performs an edge extraction process such as Sobel filtering or Laplacian filtering upon the smoothed image and converts the resultant data into binary data thereby extracting an edge image.

In the present embodiment, the face area extraction is based on the assumption that a human face area can be modeled by an ellipse. Upon this assumption, an evaluation value indicating the degree of pattern matching between the edge image and the ellipse model is calculated according to the genetic algorithm and the face area is extracted on the basis of the evaluation value.

Figure 5:
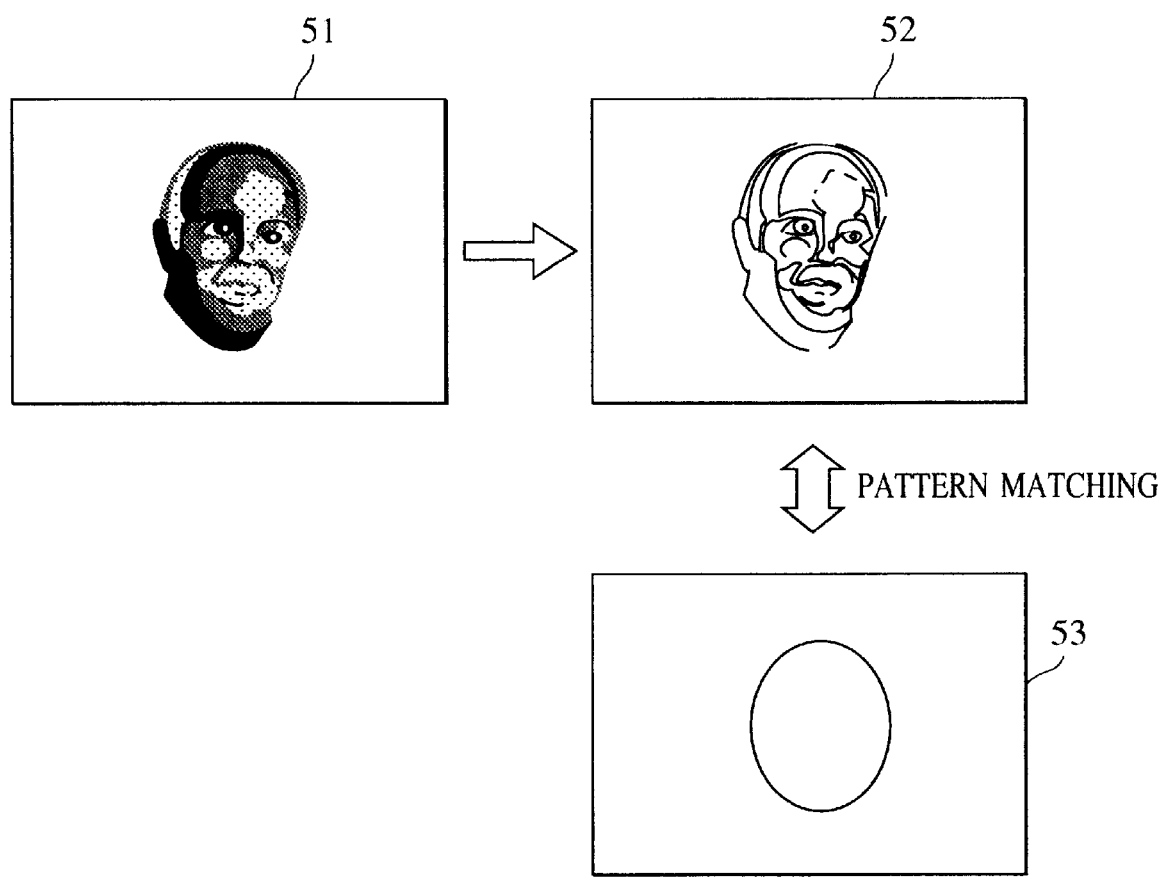
FIG. 5 schematically illustrates a specific example of a pattern matching process.

FIG. 5 illustrates an example of a pattern matching process according to the present embodiment. In FIG. 5, reference numeral 51 denotes frame image data extracted by the frame image extraction unit 12, and reference numeral 52 denotes an edge image obtained by the preprocessing unit 12. Reference numeral 52 denotes an ellipse model. Herein, the degree of pattern matching between the edge image 52 and the ellipse image 53 is evaluated.

Figure 6:
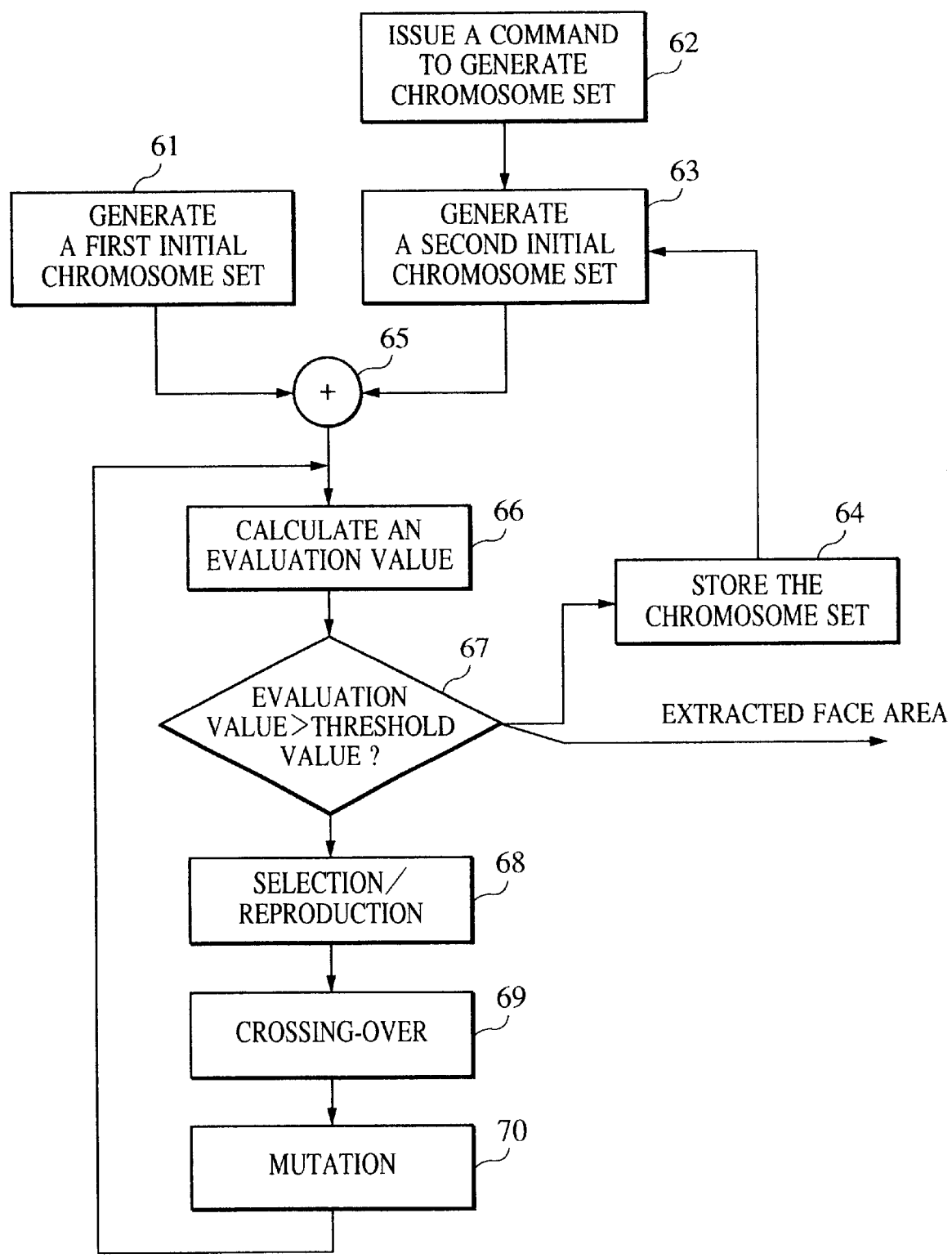
FIG. 6 is a flow chart illustrating a process performed by the genetic algorithm processing unit according to a first and second embodiments of the invention.

FIG. 6 is a flow chart illustrating a process according to the genetic algorithm of the preset embodiment. FIG. 7 illustrates the structure of a chromosome used in the present embodiment.

Figures 7A, 7B:
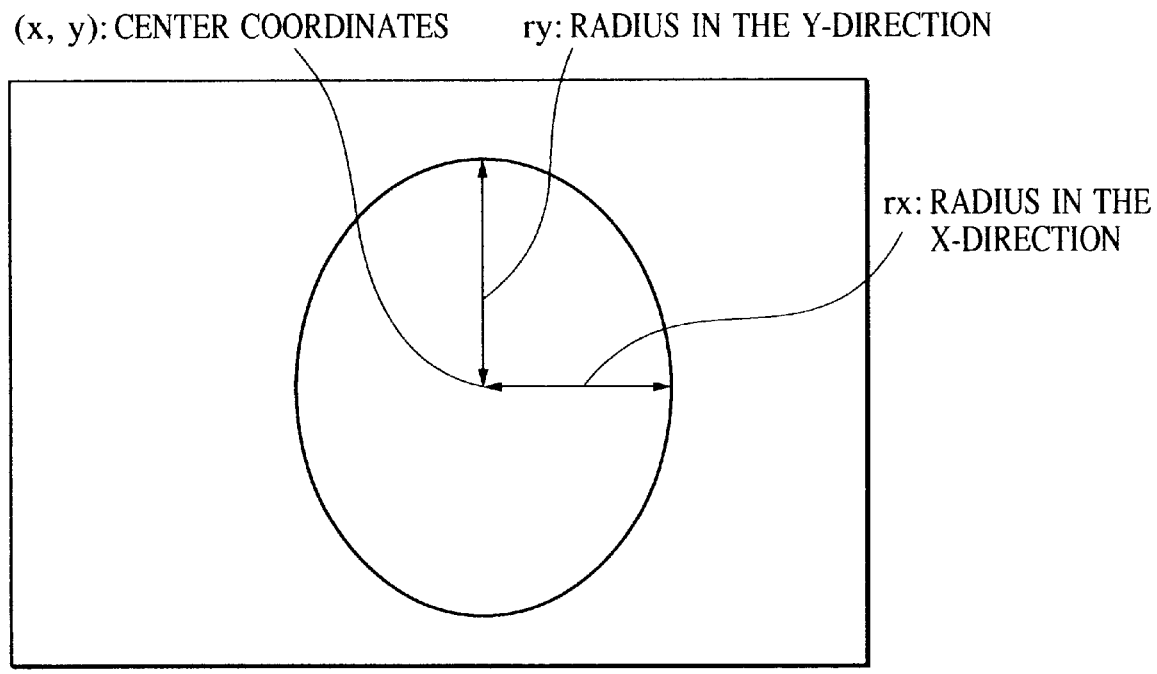
FIG. 7A illustrates a modes of a face area given as an extraction result.
FIG. 7B is a schematic representation of the structure of a chromosome.

FIG. 7A illustrates a model of a face area given as an extraction result. The face area is represented by four parameters: center coordinates (x, y), and radii rx and ry. A chromosome representing this ellipse consists of a bit string including 32 bits. The genetic algorithm processing unit searches for an optimum solution by performing an operation according to a genetic rule upon a plurality of chromosomes each having the structure shown in FIG. 7B.

Referring to FIG. 6, a first initial chromosome set generator 61 randomly generates a plurality of chromosomes each having the structure shown in FIG. 7B, using random numbers or the like. A chromosome set generation controller 62 produces parameters used to generate a set of chromosomes representing typical face areas depending on a specific application. More specifically, in the case of a video telephone or a desktop video conference system, a human image is most likely located near the center of the image. The size and the radii rx and ry of the face area relative to the total image size can be roughly estimated. More specifically, ry can be roughly estimated as the number of lines in a secondary scanning direction×20% to 40%, and rx can be roughly estimated from a statistically determined value of the aspect ratio of human faces. On the basis of such an estimation, it is possible to generate a plurality of chromosomes.

A second chromosome set generator 63 generates a set of chromosomes according to typical prediction parameters produced by the chromosome set generation controller 62. The second chromosome set generator 63 also uses the set of chromosomes of the last generation of the previous frame stored in a chromosome set memory 64. In the case of a video telephone or a desktop video conference system, the motion of a human face is limited within a rather narrow range and thus the current location of the human face is most likely near the location in the previous frame. The second chromosome set generator 63 selects a plurality of chromosomes having high evaluation values from the set of chromosomes of the last generation of the previous frame and employs them as initial chromosomes for the current frame.

The chromosomes generated by the first chromosome set generator 61 and the chromosomes generated by the second chromosome set generator 63 are employed as an initial set of chromosomes, and the genetic algorithm is applied to this initial set of chromosomes.

An evaluation value calculation unit 66 evaluates the degree of pattern matching between the edge image obtained from the frame image data and the ellipse represented by the chromosome for each of the plurality of chromosomes, and employs the correlation value as the evaluation value. After completion of calculating the evaluation value for all chromosomes, if there is a chromosome having an evaluation value greater than a predetermined threshold value, the ellipse represented by that chromosome is employed as the face area. A set of chromosomes of the last generation obtained herein is stored in the chromosome set memory 64. In the case where there is no chromosome having an evaluation value greater than the threshold value, a chromosome having a low evaluation value is removed from the set of chromosomes, and a chromosome having a high evaluation value is reproduced. Furthermore, crossing-over processing is performed upon the chromosomes produced by the selection/reproduction unit 68.

Figure 8:
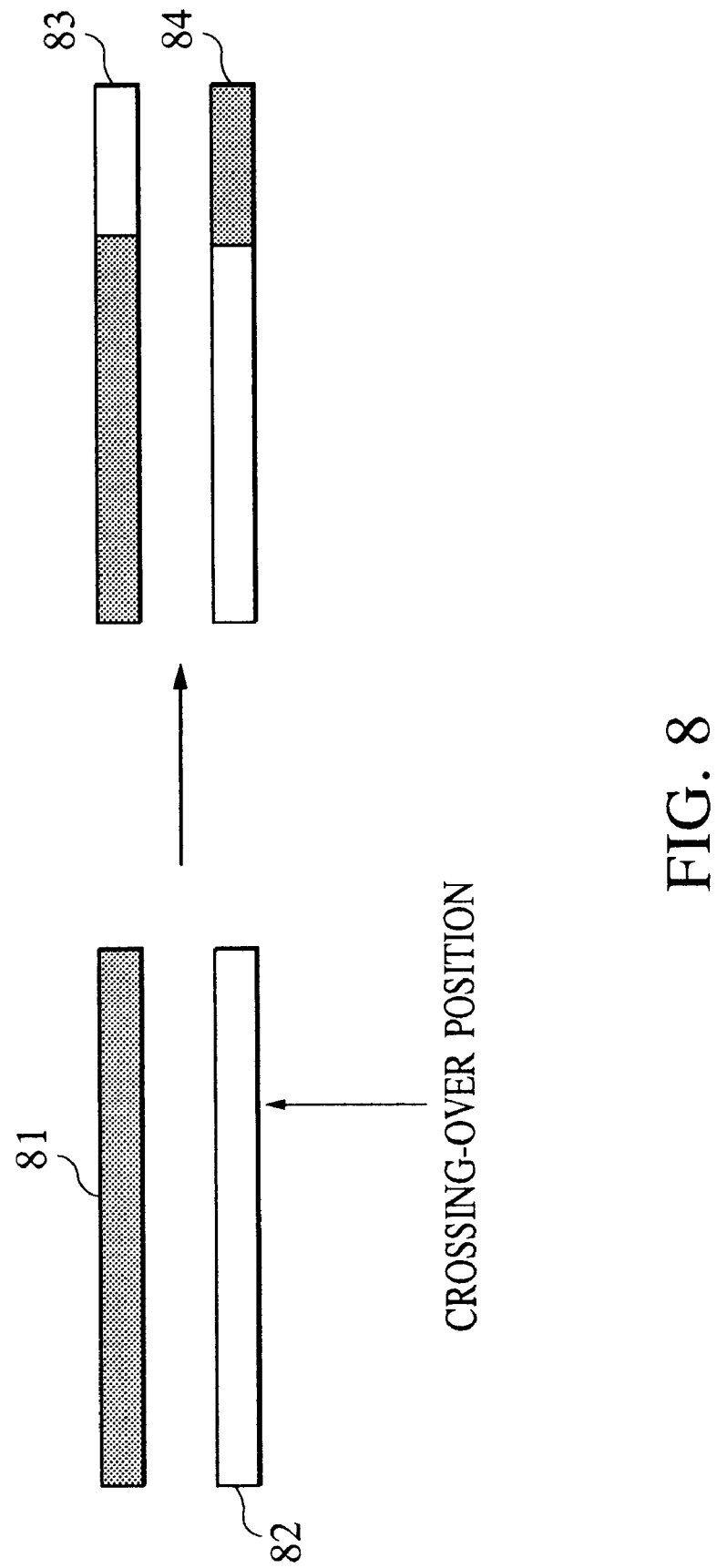
FIG. 8 is a schematic representation of crossing-over.
Figure 9:
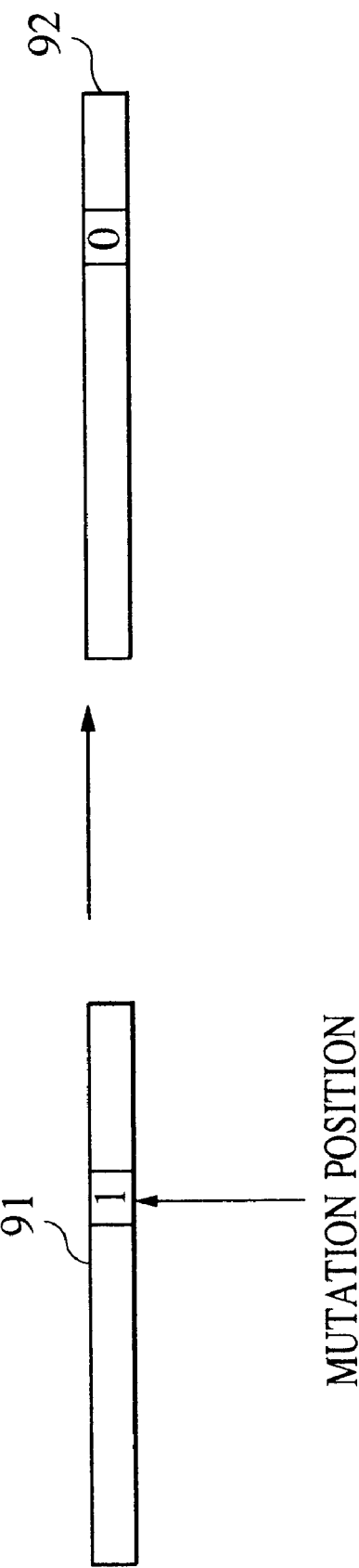
FIG. 9 is a schematic representation of crossing-over.

FIG. 8 illustrates the manner in which crossing-over is performed. Two chromosomes 81 and 82 are arbitrarily selected, and a crossing-over point is determined according to random numbers. Portions of the respective chromosomes 81 and 82 bounded by the crossing-over point are replaced with each other. Thus, new chromosomes 83 and 84 are obtained by the crossing-over. According to predetermined probabilities, a mutation unit 70 inverts the bits of the bit string of chromosomes. Reference numeral 91 denotes a chromosome before having mutation, and 92 denotes a chromosome having a bit inverted by mutation. The above-described process is performed repeatedly until an evaluation value greater than the threshold value is obtained. The inside of the ellipse represented by the chromosome obtained in the above-described manner is employed as the face area.

Figure 10:
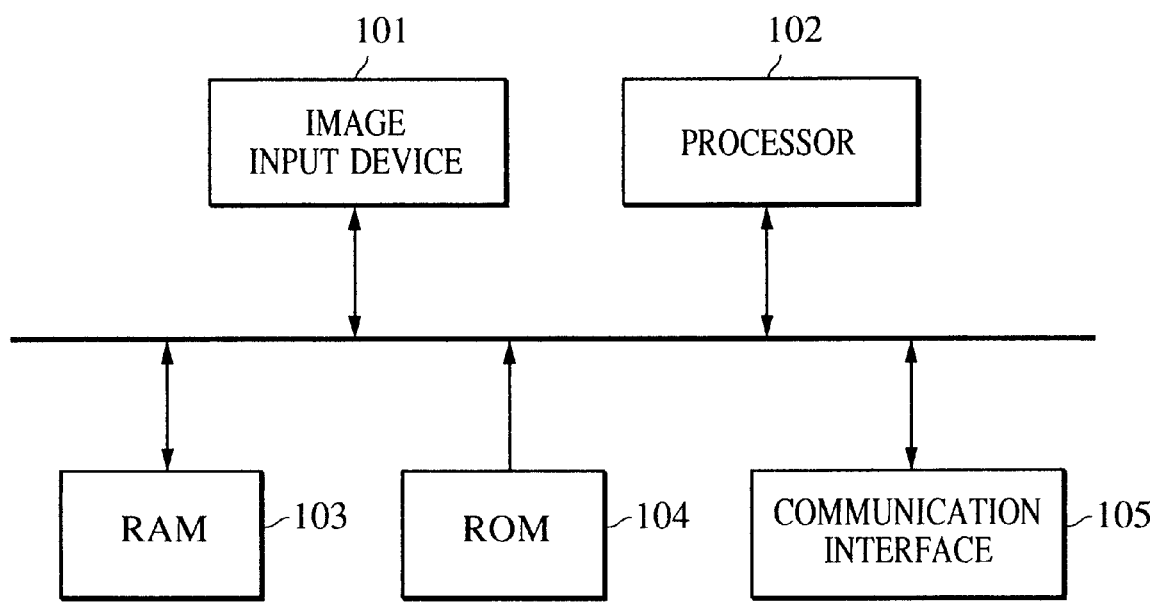
FIG. 10 is a block diagram illustrating the construction of an apparatus for performing processes using software.

FIG. 10 is a block diagram illustrating the construction of an apparatus for performing the main processes of the present embodiment using software. In FIG. 10, reference numeral 101 denotes an image input device 101 for inputting image data taken by a CCD camera or the like. The image input device 101 also serves to make a correction to the input image using hardware. Reference numeral 102 denotes a processor such as a media processor dedicated to processing a multimedia signal or a DSP (digital signal processor) for performing various kinds of signal processing. A RAM (random access memory) 103 serves as work memory used by the processor 102 and also as a buffer memory for storing image data to be processed. The RAM 103 may be realized by a high-speed and high-capacity memory such as an SDRAM (synchronous DRAM). A ROM (read only memory) 104 stores an instruction program according to which the processor 102 operates. A communication interface 105 serves as an interface via which encoded image data is output over a communication line according to a predetermined protocol.

Figure 11:
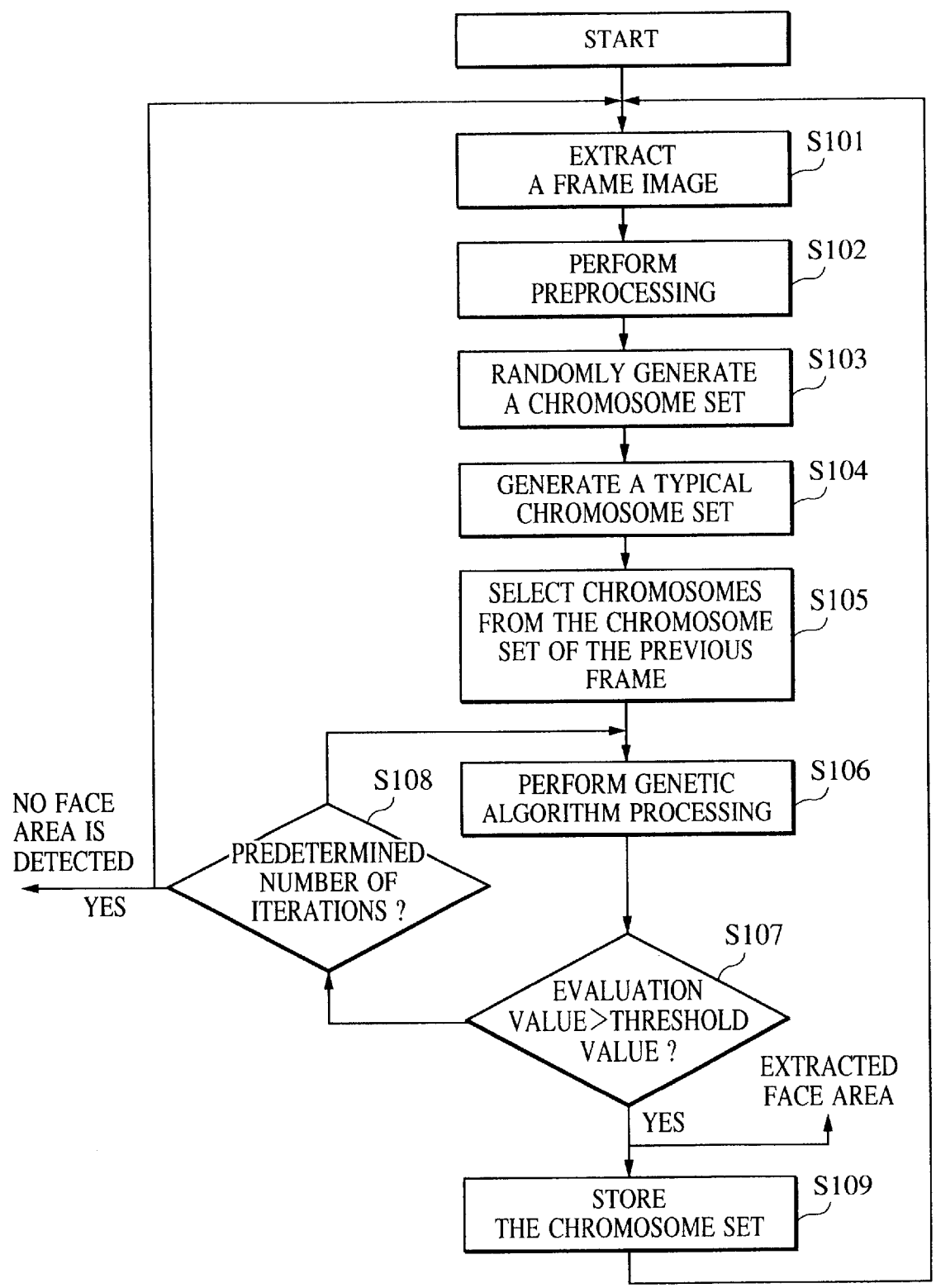
FIG. 11 is a flow chart illustrating the process of the first embodiment of the invention, using software.

Referring now to the flow charts shown in FIGS. 10 and 11, the operation of the face area detecting apparatus according to the present embodiment is described below. One frame of image data is extracted from a digital moving image data input via the image input device 101 and stored in the RAM 103 (step S101). From this image data, the processor 102 extracts a face area as described below. First, at step S102, a preprocessing process such as edge extraction is performed upon the image data stored in the RAM 163. In the subsequent step S103, an initial set of chromosomes is generated in a random fashion according to random numbers or the like. Then in step S104, a typical set of chromosomes is generated in accordance with prediction depending on a specific applications. Furthermore, in step S105, a plurality of chromosomes having high evaluation values are selected from the set of chromosomes of the last generation of the previous frame. The set of chromosomes obtained via the above steps S103 to S105 is employed as an initial set of chromosomes, and searching for an optimum solution according to the genetic algorithm is started (step S106). If a chromosome having an evaluation value greater than the predetermined threshold value is found in the plurality of chromosomes evolved according to the genetic algorithm, then the face area represented by that chromosome is employed as an extraction result to be used in the following processes such as an encoding process (step S107). The set of chromosomes of the last generation is stored (step S109), and the process for the next frame is started. In the case where no chromosome having an evaluation value greater than the threshold value is obtained in step S107, then the genetic process is repeated (step S106). However, if the number of iterations of the genetic process becomes greater than a predetermined value (step S108), then it is determined that no face area is found in the current frame, and the process for the next frame is started.

In the above process of the present embodiment, if an optimum solution predicted in advance is incorporated into the initial set of chromosomes to be processed according to the genetic algorithm, then the probability that searching for a face area is completed more quickly is increased, in particular in the case of an application such as a video telephone system or a desktop video conference system in which rough prediction of the size of a human image is possible. In the case of an application in which the motion of an image is limited within a narrow range, as in the present application, if a set of chromosomes which had high evaluation values in the previous frame is incorporated into the initial set of chromosomes, then the probability that searching for a face area is completed more quickly is increased. This allows the processor to have leeway in performing the above process using software.

Second Embodiment

Figure 12:
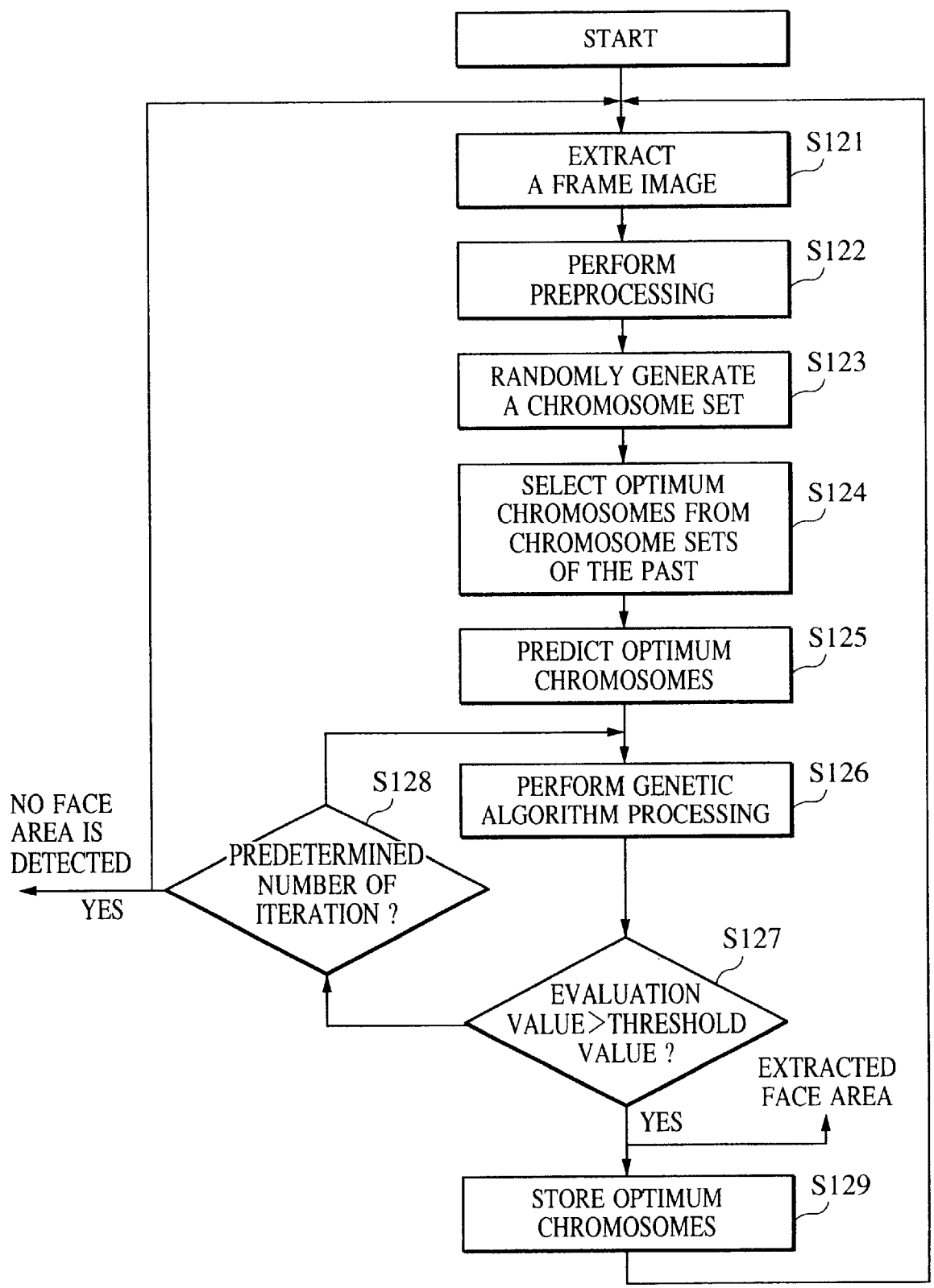
FIG. 12 is a flow chart illustrating the process of the second embodiment of the invention, using software.

A second embodiment of the present invention is described below with reference to the accompanying drawings. In this second embodiment, only differences from the first embodiment are described. FIG. 12 is a flow chart illustrating the process of the second embodiment of the invention, using software.

Figure 13:
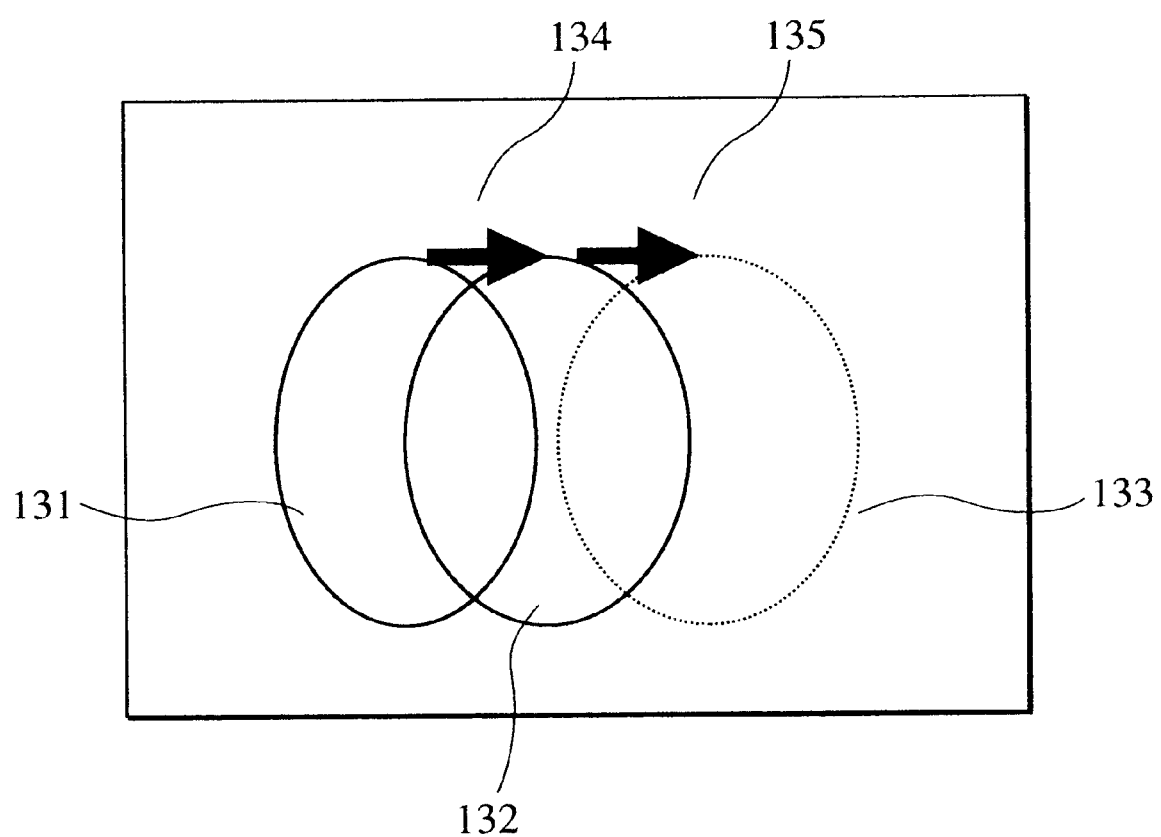
FIG. 13 is a schematic representation of prediction of a face area.

One frame of image data is extracted from a digital moving image data input via the image input device 101 and stored in the RAM 103 (step S121). From this image data, the processor 102 extracts a face area. First, at step S122, a preprocessing process such as edge extraction is performed upon the image data stored in the RAM 163. In step S123, an initial set of chromosomes is generated in a random fashion according to random numbers or the like. Then in step S104, a plurality of chromosomes which frequently appeared in the past are selected from the chromosomes which were determined as optimum solutions in the past. Then in step S125, an optimum solution for the current frame to be processed is predicted from the optimum solutions of chromosomes for two frames immediately previous and further previous to the current frame. FIG. 13 illustrates a specific example of the manner of predicting an optimum solution. In FIG. 13, reference numeral 132 denotes an ellipse obtained as the optimum solution for the immediately previous frame, and reference numeral 131 denotes an ellipse obtained as the optimum solution for the further previous frame. A motion vector 134 can be obtained from the ellipses 131 and 132. A predicted optimum solution 133 can be determined from the optimum solution 132 for the immediately previous frame and the predicted motion 135 determined from the motion vector 134. Furthermore, the variation in the size can be predicted from a vector calculated by comparing the immediately previous frame and the further previous frame with each other. Thus, in step S125, chromosomes representing the optimum solution are predicted. The set of chromosomes obtained via the above steps S123 to S125 is employed as an initial set of chromosomes, and searching for an optimum solution according to the genetic algorithm is started (step S126). If a chromosome having an evaluation value greater than the predetermined threshold value is found in the plurality of chromosomes evolved according to the genetic algorithm, then the face area represented by that chromosome is employed as an extraction result to be used in the following processes such as an encoding process (step S127). The resultant optimum chromosome is stored (step S129), the process for the next frame is started. In the case where no chromosome having an evaluation value greater than the threshold value is obtained in step S127, then the genetic process is repeated (step S126). However, if the number of iterations of the genetic process becomes greater than a predetermined value (step S128), then it is determined that the current frame includes no face area, and the process for the next frame is started.

In the above process, if a plurality of chromosomes frequently obtained as optimum solutions in the past are incorporated into the initial set of chromosomes to be processed according to the genetic algorithm, then the probability that searching for a face area is completed more quickly is increased in the case of an application such as a video telephone system or a desktop video conference system in which the manner of the motion of a face area in an image is rather limited. Furthermore, in the case of an application in which the motion of an image is limited within a narrow range, as in the present application, if a plurality of chromosomes predicted from the optimum solutions for a plurality of frames in the past are incorporated into the initial set of chromosomes, then the probability that searching for a face area is completed more quickly is increased. This allows the processor to have leeway in performing the above process using software.

Third Embodiment

Figure 14:
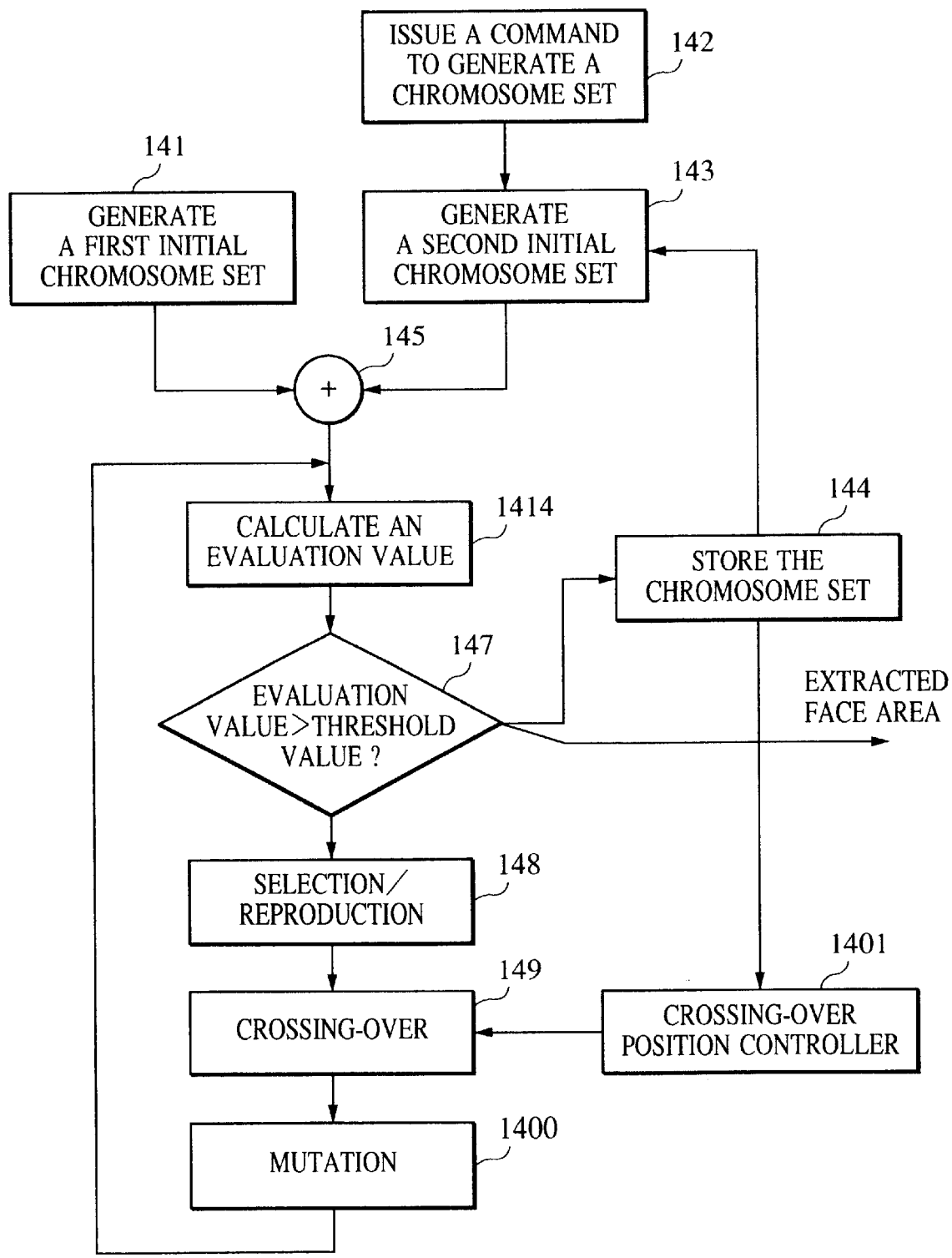
FIG. 14 is a flow chart illustrating a process performed by the genetic algorithm processing unit according to a third embodiment of the invention.
Figure 15:
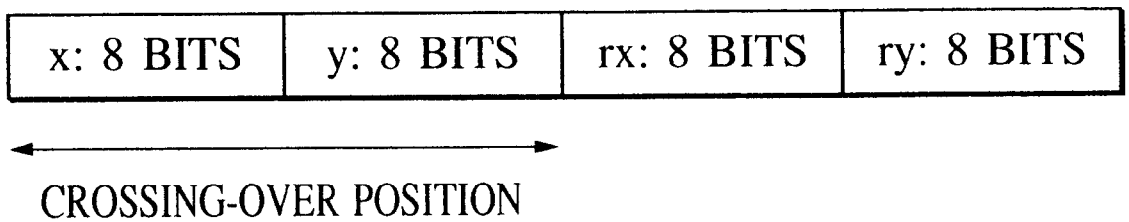
FIG. 15 is a schematic representation of limitations associated with the crossing-over position.

A third embodiment of the present invention is described below with reference to the accompanying drawings. In this second embodiment, only differences from the first embodiment are described. FIG. 14 illustrates the construction of a genetic algorithm processing unit according to the present embodiment of the invention. Compared with the construction shown in FIG. 6, the construction shown in FIG. 14 includes an additional unit, that is, a crossing-over position controller 1401. In the present embodiment, if a face area has been extracted for the previous frame, the crossing-over position controller 1401 limits the crossing-over positions allowed in the genetic algorithm processing upon chromosomes, according to the detection result for the previous frame and the elapsed time required for the genetic algorithm processing. More specifically, if a face area is detected in the previous frame and if the chromosome detection result for the previous range is stored in the chromosome memory 144, then the crossing-over positions are limited to the bits which represent the center coordinates of the face area. FIG. 15 illustrates the range within which crossing-over is limited. That is, the crossing-over positions are limited within the range represented by a double-headed arrow in FIG. 15. However, in the case where no optimum solution is obtained even after the process has been iterated a predetermined number of times or after a predetermined period of time has elapsed, the above-described limitation is cancelled, and crossing-over is allowed at any position.

In the above process according to the present embodiment, if a face area has been extracted in the previous frame, only the chromosomes selected from the set of chromosomes of the last generation of the previous frame are used, and the crossing-over positions are limited, thereby making it possible to search for a face area mainly on the basis of the variation in the face area location obtained in the previous frame. In the case where no solution is obtained even after a predetermined period of time has elapsed, it is determined that a great change has occurred in the size of the face, and the face area is searched for taking into account the size of the face. Thus, it is possible to increase the probability that searching is completed in a short time when the face has a small change in size but a large change in location. This allows the processor to have leeway in performing the above process using software.

Fourth Embodiment

Figure 16:
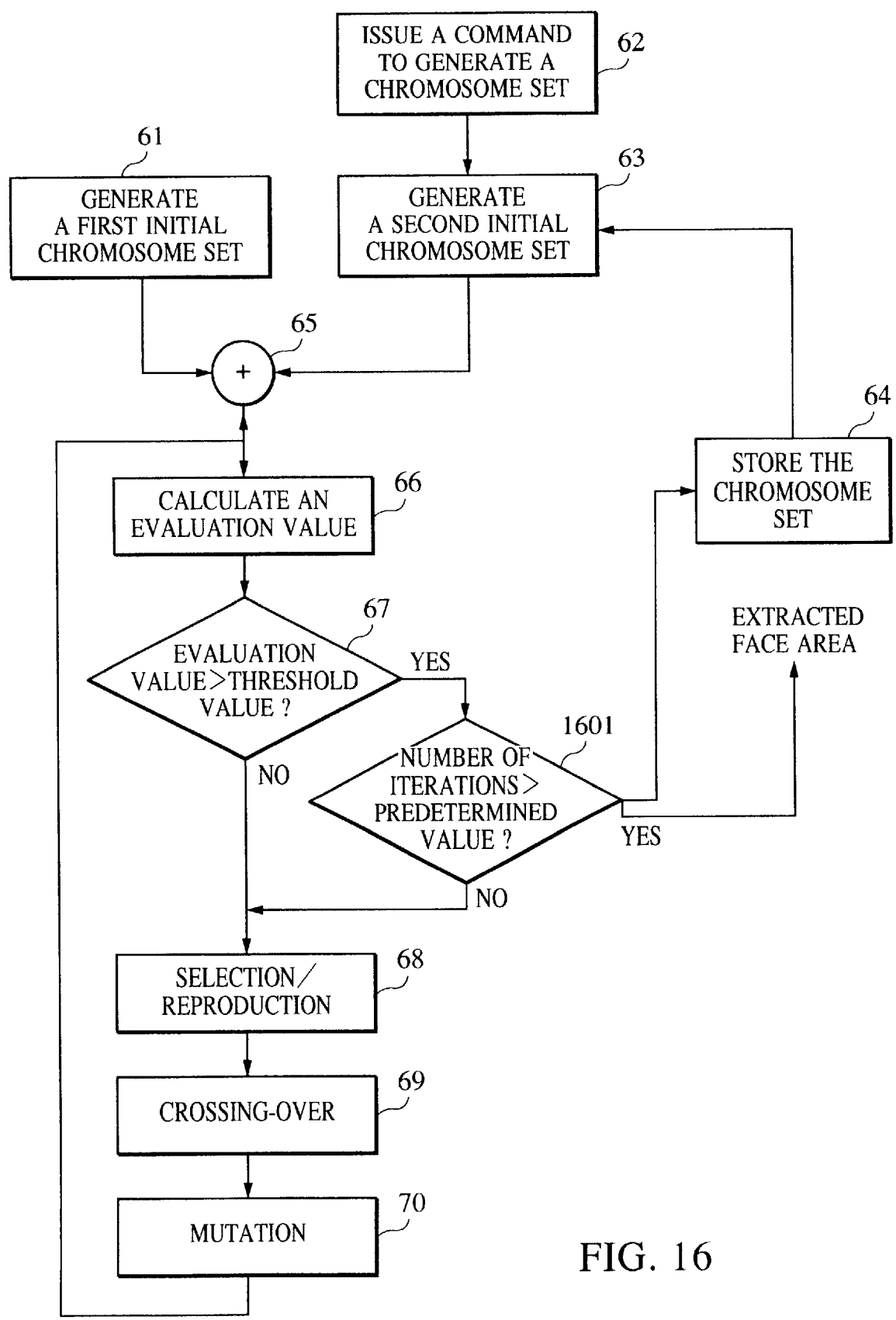
FIG. 16 is a flow chart illustrating a process performed by the genetic algorithm processing unit according to a fourth embodiment of the invention.

A fourth embodiment is described below with reference to the accompanying drawings. In this fourth embodiment, only differences from the first embodiment are described. FIG. 16 illustrates the construction of a genetic algorithm processing unit according to the present embodiment of the invention. Compared with the construction shown in FIG. 6, the construction shown in FIG. 16 includes an additional step 1601 for determining whether or not the genetic algorithm processing should be ended.

An evaluation value calculation unit 66 evaluates the degree of pattern matching between the edge image obtained from the frame image data and the ellipse represented by the chromosome for each of the plurality of chromosomes, and employs the correlation value as the evaluation value. After completion of calculating the evaluation value for all chromosomes, if a chromosome having an evaluation value greater than a predetermined threshold value is obtained in step 67, and if the genetic processing loop consisting of steps 66, 67, 68, 69, and 70 has been iterated a predetermined number of times or more (step 1601), the face area represented by the chromosome having the greatest evaluation value is employed as the extraction result.

In searching for a solution for the current frame according to the genetic algorithm, even when a chromosome having an evaluation value greater than the predetermined threshold value, there is a possibility that the solution given by that chromosome converges on a solution which is not optimum for the current frame, that is, there is a possibility that a local optimum solution is obtained. In the preset embodiment, to avoid the above problem, even in the case where although a chromosome having an evaluation value greater than the predetermined threshold value has been obtained via the genetic processing, the chromosome does not give an optimum solution for the current frame, or even in the case where although an initial chromosome produced by the second initial chromosome set generator 163 has an evaluation value greater than the predetermined threshold value has been obtained via the genetic processing, the chromosome does not give an optimum solution for the current frame, the genetic processing is iterated at least a predetermined number of times or more, and a chromosome having a greatest evaluation value is employed as a solution for the current frame. This makes it possible to search for a more optimum solution for the current frame thereby obtaining a more precise solution.

For example, when the optimum chromosome for the previous frame is employed as an initial chromosome for the current frame by the second initial chromosome set generator 163, however, a slight difference of the current frame from the previous frame can introduce a possibility that the initial chromosome does not give an optimum solution for the current frame even if the evaluation value of that initial chromosome is greater than the predetermined threshold value. Also in this case, instead of employing the initial chromosome as a solution without performing the genetic processing, the genetic processing is iterated at least a predetermined number of times or more, and a chromosome having a greatest evaluation value is employed as a solution. This makes it possible to search for a more optimum solution for the current frame.

When a chromosome which was not very suitable for the previous frame is employed by the second initial chromosome set generator 164 as an initial chromosome for the current frame, even if the evaluation value of the initial chromosome is greater than the predetermined threshold value because of a small difference of the current frame from the previous frame, there is a possibility that the initial chromosome is not an optimum solution for the current frame. Also in this case, instead of employing the initial chromosome as a solution without performing the genetic processing, the genetic processing is iterated at least a predetermined number of times or more, and a chromosome having a greatest evaluation value is employed as a solution for the current frame. This makes it possible to search for a more optimum solution for the current frame.

In the present embodiment, as described above, the genetic processing is iterated at least a predetermined number of times or more, and a chromosome having a greatest evaluation value is employed as a solution of the genetic algorithm. This allows an improvement in the accuracy of the solution whereas a slight increase in the amount of processing is required.

Fifth Embodiment

Figure 17:
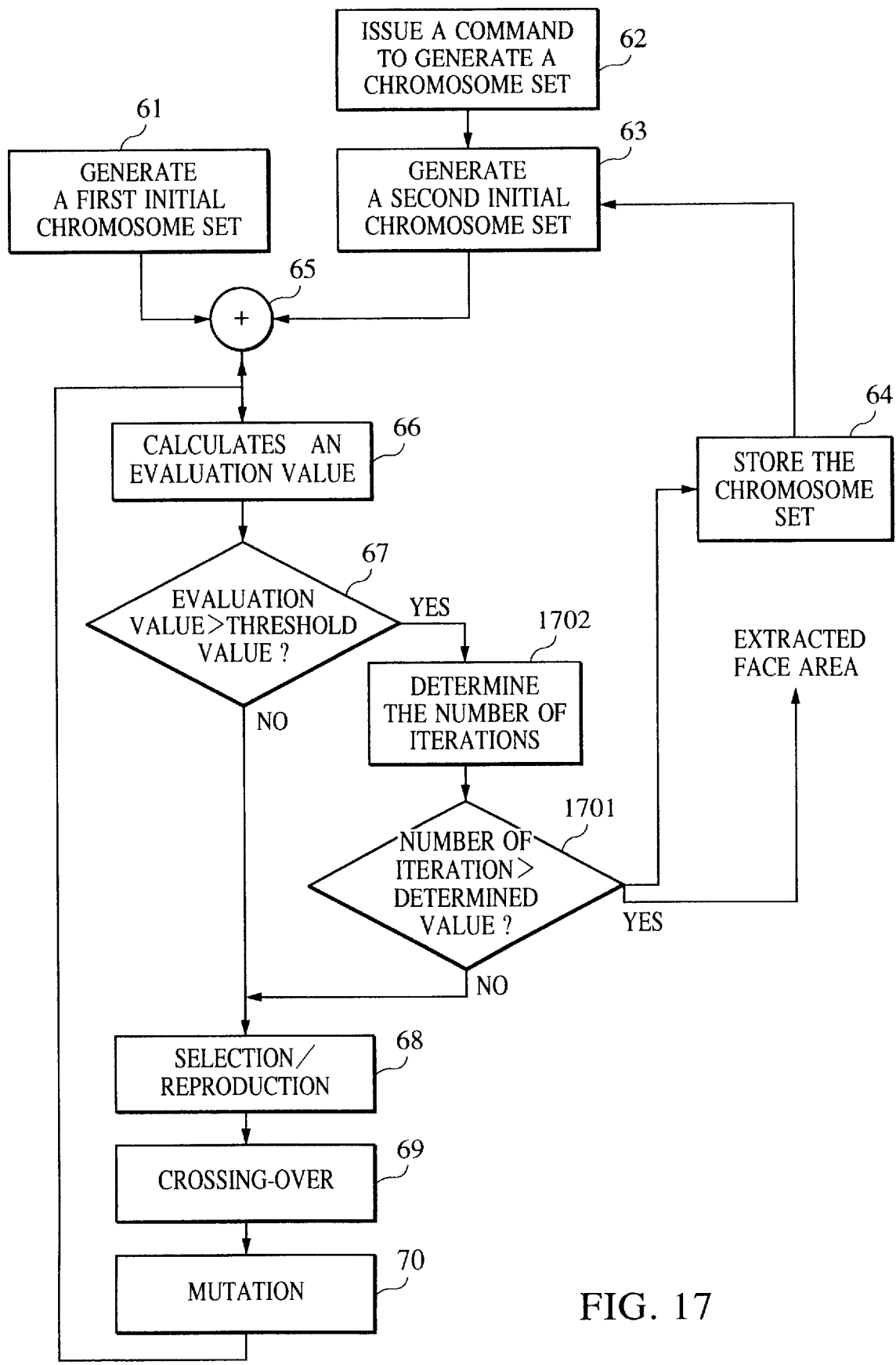
FIG. 17 is a flow chart illustrating a process performed by the genetic algorithm processing unit according to a fifth embodiment of the invention.

A fifth embodiment is described below with reference to the accompanying drawings. In this fifth embodiment, only differences from the fourth embodiment are described. FIG. 17 illustrates the construction of a genetic algorithm processing unit according to the present embodiment of the invention. The difference of the construction shown in FIG. 17 from that shown in FIG. 16 is that there is additionally provided a number-of-iterations determination unit 1702 for determining the minimum number of iterations of the genetic algorithm processing.

An evaluation value calculation unit 66 evaluates the degree of pattern matching between the edge image obtained from the frame image data and the ellipse represented by the chromosome for each of the plurality of chromosomes, and employs the correlation value as the evaluation value. After completion of calculating the evaluation value for all chromosomes, if a chromosome having an evaluation value greater than a predetermined threshold value is obtained in step 67, and if the genetic processing loop consisting of steps 66, 67, 68, 69, and 70 has been iterated a predetermined number of times or more (step 1701), the face area represented by the chromosome having the greatest evaluation value is employed as the extraction result.

The minimum number of iterations is determined by the number-of-iterations determination unit 1702 in accordance with the evaluation value of a chromosome having a greatest evaluation value and the increase in the evaluation value of the from the value of a chromosome having a greatest evaluation value in the previous iteration of the genetic processing.

More specifically, if the increase in the evaluation value becomes smaller than a predetermined value, the minimum number of iterations of the genetic processing is reduced. Alternatively, the minimum number of iterations of the genetic processing may be reduced when the increasing ratio of the evaluation value becomes smaller than a predetermined value.

In the present embodiment, as described above, the genetic processing is iterated at least a predetermined number of times or more, and a chromosome having a greatest evaluation value is employed as a solution of the genetic algorithm. This makes it possible to search for a more accurate solution. Furthermore, by changing the minimum number of iterations of the genetic processing in accordance with the increase in the evaluation value, it is possible to increase the probability that the searching is completed in a shorter time.

Other Embodiments

In the first embodiment, when the apparatus is started, a user may input parameters into the initial chromosome generation controller 17 by designating parameters displayed on a display device via a pointing device such as a mouse so that the second initial chromosome set generator 16 generates an initial set of chromosomes on the basis of the given parameters. In this case, although the user has to input parameters, it is possible to further increase the searching speed.

In the third embodiment, the crossing-over positions may be limited to bits representing the face size, as opposed to the bit positions employed in the third embodiment. In this case, it becomes possible to perform searching chiefly on the basis of the face size. Thus, depending on the application, the searching speed is increased.

The techniques disclosed in the first to third embodiments may be combined together as required, or only a part of techniques disclosed in any embodiment may be utilized.

Although in the embodiments described above, a face area is extracted using an edge image on the basis of the ellipse face area model, the area extraction method according to the present invention is not limited to such a method. Instead, other various methods may also be employed. For example, templates representing actual face images are prepared, and a face area may be extracted by evaluating the correlation of an area of interest with the templates. Furthermore, the methods of performing crossing-over and mutation are not limited to those described above with reference to the embodiments. Various known methods may also be employed.

Furthermore, although in the embodiments described above a face area is extracted, the area to be extracted is not limited to the face area. When a moving image is given, any area which is important for a user may be extracted.

The present invention is not limited to the above embodiments and various changes and modifications can be made within the spirit and scope of the present invention. Therefore, to apprise the public of the scope of the present invention, the following claims are made.

What is claimed is:

1. An image processing method for determining an area representing a particular image from a moving image using a genetic algorithm, said method comprising:

an extraction step for extracting a frame image from a series of moving image data;

a first production step for randomly producing a plurality of initial chromosomes including a parameter indicating an area of the particular image;

a second production step for producing a plurality of initial chromosomes including a parameter indicating an area of the particular image according to a predetermined condition;

an evaluation step for determining an evaluation value indicating the fitness, to the frame image, of the plurality of chromosomes produced in said first and second production steps;

a selection/reproduction step in which a chromosome having a low evaluation value is removed from the plurality of chromosomes, and a chromosome having a high evaluation value is reproduced;

a crossing-over step for performing crossing-over with a predetermined probability upon a plurality of chromosomes obtained in said selection/reproduction step;

a mutation step for performing mutation upon a plurality of chromosomes obtained in said crossing-over step; and a determination step in which, if a chromosome is obtained which has an evaluation value greater than a predetermined threshold value under a predetermined condition after iterating said evaluation step, selection/reproduction step, crossing-over step, and mutation step, a parameter represented by the chromosome is determined as a parameter representing the area of the particular image of the frame image.

2. An image processing method according to claim 1, wherein in said second production step for producing a plurality of initial chromosomes, chromosomes of the last generation of a previous frame image are employed as the initial chromosomes thereby producing the initial chromosomes.

3. An image processing method according to claim 1, wherein in said second production step for producing a plurality of initial chromosomes, variation information associated with the area of the particular image is generated from the determination results for a plurality of frames previous to the current frame to be processed, and the initial chromosomes are produced by means of prediction on the basis of the variation information.

4. An image processing method according to claim 1, wherein in said second production step for producing a plurality of initial chromosomes, the initial chromosomes are produced on the basis of a plurality of chromosomes which were frequently determined, in the past, as representing an area of the particular image.

5. An image processing method according to claim 1, wherein in said second production step for producing a plurality of initial chromosomes, the initial chromosomes are produced on the basis of a typical area of the particular image predicted depending on an application to which said image processing method is applied.

6. An image processing method according to claim 1, wherein in said second production step for producing a plurality of initial chromosomes, the initial chromosomes are produced on the basis of an instruction given by a user.

7. An image processing method according to claim 1, wherein a mixing ratio of the number of initial chromosomes produced in said first production step for producing a plurality of initial chromosomes to that produced in said second production step for producing a plurality of initial chromosomes varies in accordance with the determination result for a previous frame.

8. An image processing method according to claim 1, wherein in said crossing-over step, a crossing-over position is limited in accordance with the determination result for a previous frame and an elapsed processing time.

9. An image processing method according to claim 1, wherein in said determination step, a series of processes according to the genetic algorithm is iterated at least a predetermined number of times.

10. An image processing method according to claim 9, wherein the predetermined number of times is set in accordance with the evaluation result.

* * * * *